United States Patent
Koizumi

(10) Patent No.: US 8,055,924 B2
(45) Date of Patent: Nov. 8, 2011

(54) SEMICONDUCTOR INTEGRATED CIRCUIT AND ELECTRIC POWER SUPPLY CONTROLLING METHOD THEREOF

(75) Inventor: Shinya Koizumi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 848 days.

(21) Appl. No.: 11/968,848

(22) Filed: Jan. 3, 2008

(65) Prior Publication Data

US 2008/0178030 A1    Jul. 24, 2008

(30) Foreign Application Priority Data

Jan. 24, 2007   (JP) ............................. P. 2007-014138

(51) Int. Cl.
*G06F 1/32* (2006.01)
(52) U.S. Cl. ......... 713/324; 713/300; 713/320; 710/260
(58) Field of Classification Search .................. 713/300, 713/320, 321, 323, 324; 710/48, 260
See application file for complete search history.

(56) References Cited

U.S. PATENT DOCUMENTS

| | | | |
|---|---|---|---|
| 5,361,364 A * | 11/1994 | Nagashige et al. | 713/300 |
| 5,832,286 A | 11/1998 | Yoshida | |
| 5,913,068 A | 6/1999 | Matoba | |
| 7,023,757 B2 | 4/2006 | Watanabe et al. | |
| 7,197,654 B2 * | 3/2007 | Olsen | 713/323 |
| 7,320,077 B2 * | 1/2008 | Kim | 713/300 |
| 7,752,467 B2 | 7/2010 | Tokue | |
| 2005/0213380 A1 | 9/2005 | Taniguchi et al. | |
| 2006/0075267 A1 * | 4/2006 | Tokue | 713/300 |
| 2008/0022140 A1 * | 1/2008 | Yamada et al. | 713/322 |

FOREIGN PATENT DOCUMENTS

| | | |
|---|---|---|
| JP | 07-141074 | 6/1995 |
| JP | 2004-021574 | 1/2004 |
| JP | 2004-96073 | 3/2004 |
| JP | 3724472 | 9/2005 |
| JP | 2006-107127 | 4/2006 |

* cited by examiner

*Primary Examiner* — Glenn A Auve
(74) *Attorney, Agent, or Firm* — McDermott Will & Emery LLP

(57) ABSTRACT

An interrupt power supply control unit 5 monitors interrupts 11, 21, 31 issued from function blocks 1, 2, 3, and also, a power supply control instruction 41 issued from a CPU 4. When either an interrupt or an instruction is issued, the interrupt power supply control unit 5 performs a power supply control operation in accordance with a content of an interrupt power supply control table 50. In the power supply control operation, ON/OFF-control operations of power supply switches 12, 22, 32, 42 are carried out, and also, control signals 581 and 582 are outputted to power supply cutoff solving elements 81 and 82. When electric power of the power supply is supplied to a necessary function block in accordance with the power supply control operation, the interrupt power supply control unit 5 initiates the relevant function block in accordance with the content of the interrupt power supply control table 50.

16 Claims, 8 Drawing Sheets

| POWER SUPPLY \ INTERRUPT | CPU 4 | FUNCTION BLOCK 1 | FUNCTION BLOCK 2 | FUNCTION BLOCK 3 | INITIATION |
|---|---|---|---|---|---|
| INSTRUCTION 41 | OFF | OFF | OFF | OFF | 1 |
| INTERRUPT 11 | OFF | OFF | ON | ON | 2 |
| INTERRUPT 21 | ON | OFF | OFF | ON | 4 |
| INTERRUPT 31 | OFF | ON | OFF | OFF | 1 |
| INTERRUPT 61 | ON | ON | ON | OFF | 3 |
| INTERRUPT 71 | OFF | OFF | ON | ON | 4 |

| POWER SUPPLY / INTERRUPT | CPU 4 | FUNCTION BLOCK 1 | FUNCTION BLOCK 2 | FUNCTION BLOCK 3 | INITIATION |
|---|---|---|---|---|---|
| INSTRUCTION 41 | OFF | OFF | OFF | OFF | 1 |
| INTERRUPT 11 | OFF | OFF | ON | ON | 2 |
| INTERRUPT 21 | ON | OFF | OFF | ON | 4 |
| INTERRUPT 31 | OFF | ON | OFF | OFF | 1 |
| INTERRUPT 61 | ON | ON | ON | OFF | 3 |
| INTERRUPT 71 | OFF | OFF | ON | ON | 4 |

| POWER SUPPLY / INTERRUPT | CPU 4 | FUNCTION BLOCK 1 | FUNCTION BLOCK 2 | FUNCTION BLOCK 3 | INITIATION |
|---|---|---|---|---|---|
| INSTRUCTION 41 | OFF | OFF | OFF | OFF | 1 |
| INTERRUPT 11 | OFF | OFF | 0.9V | 0.9V | 2 |
| INTERRUPT 21 | 1.2V | OFF | OFF | 0.9V | 4 |
| INTERRUPT 31 | OFF | 1.2V | OFF | OFF | 1 |
| INTERRUPT 61 | 1.2V | 0.9V | 0.9V | OFF | 3 |
| INTERRUPT 71 | OFF | OFF | 1.2V | 0.9V | 4 |

FIG. 12

| INTERRUPT \ POWER SUPPLY | CPU 4 | FUNCTION BLOCK 1 | FUNCTION BLOCK 2 | FUNCTION BLOCK 3 | INITIATION |
|---|---|---|---|---|---|
| INSTRUCTION 41 | OFF/BBB | OFF/BBB | OFF/BBB | OFF/BBB | 1 |
| INTERRUPT 11 | OFF/BBB | OFF/BBB | 0.9V/ZBB | 0.9V/ZBB | 2 |
| INTERRUPT 21 | 1.2V/ZBB | OFF/BBB | OFF/BBB | 0.9V/ZBB | 4 |
| INTERRUPT 31 | OFF/BBB | 1.2V/ZBB | OFF/BBB | OFF/BBB | 1 |
| INTERRUPT 61 | 1.2V/ZBB | OFF/BBB | OFF/BBB | 0.9V/ZBB | 4 |
| INTERRUPT 71 | OFF/BBB | 1.2V/ZBB | OFF/BBB | OFF/BBB | 1 |

SEMICONDUCTOR INTEGRATED CIRCUIT AND ELECTRIC POWER SUPPLY CONTROLLING METHOD THEREOF

CLAIM OF PRIORITY

This application claims the benefit of Japanese Patent Application No. JP 2007-014138, filed on Jan. 24, 2007, the disclosure of which is incorporated herein by reference.

BACKGROUND OF THE INVENTION

1. Field of the Invention

The present invention is related to a semiconductor integrated circuit and an electric power supply controlling method thereof.

2. Description of the Related Art

As semiconductor manufacturing processes have become handling very fine patterns, leak currents cannot be neglected, while these leak currents flow during waiting statuses where circuits are not operated. The leak currents may constitute one of factors for increasing power consumption of the semiconductor circuits. In order to reduce these leak currents, cutting off power supplies is the most effective method.

A patent publication 1 has described a semiconductor integrated circuit which performs a power supply cutting off operation. The semiconductor integrated circuit described in the patent publication 1 has 2 power supply modes, namely, an operation mode and a standby mode. A power supply domain has been subdivided into a main circuit and a standby circuit. The main circuit contains a CPU to which electric power of the power supply is supplied during only the operation mode. The electric power of the power supply is continuously supplied to the standby circuit. When the standby circuit receives a transfer instruction for transferring the operation mode of the system to the standby mode from the CPU, the standby circuit turns OFF the power supply of the main circuit so as to transfer the system to the standby mode. When an interrupt is issued, the standby circuit holds a factor of the interrupt, and turns ON the power supply of the main circuit. The CPU specifies the interrupt factor held in the standby circuit, and performs a process operation corresponding to this specified interrupt factor.

Also, a semiconductor integrated circuit described in a patent publication 2 contains a power supply domain similar to that of the patent publication 1, and also, does not have such a power supply cutting off circuit, but has a substrate bias control circuit. When the operation mode is transferred to the standby mode, the substrate bias control circuit controls a substrate bias voltage of the main circuit to a high threshold voltage. On the other hand, when the operation mode is recovered from the standby mode, the substrate bias control circuit commences the operation after the high threshold voltage is returned to a zero bias voltage. As previously described, as the method for reducing the leak currents, the substrate bias voltage control operation is carried out, while the power supply cutting off operation is not performed, so that the semiconductor integrated circuit may be recovered to the operation mode in a high speed from the standby mode.

Patent Publication 1: Japanese Patent No. 3724472
Patent Publication 2: JP-A-2004-96073

However, in the above-described electric power supply controlling methods for the semiconductor integrated circuits, when the operation mode is transferred to the standby mode and also the operation mode is recovered from the standby mode, the control operations by the CPU intervene. As a result, the power supply domain containing the CPU must be necessarily required to be brought into the power supply ON status during the operation mode. Although a mode control operation and an interrupt process operation executed between the standby mode and the operation mode do not always require the process operations by the CPU, since the control operations by the CPU intervene, the power supply of the power supply domain (CPU domain) containing the CPU could not be turned OFF during the operation mode. In a system LSI, since such a portion occupied by a CPU domain is large, this occupied area cannot be neglected. As a result, it is very effective to reduce power consumption of the CPU domain.

SUMMARY OF THE INVENTION

An object of the present invention is to provide a semiconductor integrated circuit capable of reducing power consumption of a CPU domain during operation mode, and also to provide an electric power supply controlling method used for the semiconductor integrated circuit.

The present invention is to provide a semiconductor integrated circuit comprising: a plurality of function blocks; a CPU (central processing unit); a power supply control unit to which electric power of a power supply is continuously supplied, and which controls supplying of electric power of the power supply to the plurality of function blocks and the CPU; and a plurality of switch units controlled by the power supply control unit, for switching an electric power supplying operation of the power supply and an electric power cutting off operation thereof with respect to each of the plural function blocks and the CPU; in which in response to either an interrupt issued from any one of the plural function blocks or an instruction issued from the CPU, the power supply control unit controls each of the plural switch units, and thereafter, initiates at least one of the plural function blocks and the CPU. As a result, at the operation mode in which the process operation by the CPU is not required, the power supply of the CPU can be set to the OFF status. As a consequence, the power consumption of the CPU domain can be reduced.

In the above-described semiconductor integrated circuit, the power supply control unit stores control contents corresponding to the respective interrupts issued from the plural function blocks and the respective instructions issued from the CPU; and based upon a control content corresponding to either an interrupt issued from any one of the plural functions or an instruction issued from the CPU, the power supply control unit controls the plurality of switch units so as to initiate at least one of the plural function blocks and the CPU. As a result, the power supply controls for the plural function blocks and the CPU can be easily performed.

In the above-described semiconductor integrated circuit, the semiconductor integrated circuit is further comprised of: a power supply cutoff solving unit for varying a signal which is inputted from one function block to another function block, which are contained in the plural function blocks; and in which the power supply control unit controls the power supply cutoff solving unit in such a manner that a level of a signal is forcibly fixed to a low level, while the signal is propagated from a function block whose power supply is cut off to a function block to which electric power of the power supply is supplied. As a consequence, it is possible to avoid that a feedthrough current flows through the function block which receives the signal outputted from the function block whose power supply is cut off.

In the above-described semiconductor integrated circuit, the power supply control unit switches the plurality of switch units, and after a predetermined time has elapsed, the power supply control unit initiates at least one of the plural function blocks and the CPU. As a result, after the power supply voltage has been stabilized by performing the power supply control, the function block which will be subsequently initiated can be firmly operated.

In the above-described semiconductor integrated circuit, an interrupt issued from any one of the plural function blocks contains both a formal interrupt and a provisional interrupt which is issued prior to the formal interrupt; and the power supply control unit starts to supply electric power of the power supply with respect to at least one of the plural function blocks and the CPU, which will be subsequently initiated, in response to the provisional interrupt. As a result, the power supply of the function block which will be subsequently initiated can be stabilized between the occurrence of the provisional interrupt and the occurrence of the normal interrupt. As a consequence, just after the normal interrupt has occurred, the operation of the function block can be commenced, so that a time lag does not occur.

In the above-described semiconductor integrated circuit, the power supply control unit is comprised of: a timer unit for starting a time counting operation in response to the provisional interrupt; and in such a case that the formal interrupt is not issued even when a counted time of the timer unit has elapsed a predetermined time, the power supply control unit initiates the CPU. As a result, a fail-safe function can be realized with respect to such an abnormal case that the normal interrupt is not yet issued although the provisional interrupt has been received.

In the above-described semiconductor integrated circuit, the power supply control unit is comprised of: a storage unit for storing thereinto initializing data used to initialize the function block; and a transferring unit for transferring the initializing data to a function block which will be subsequently initiated; and after the electric power supply control operation is carried out, the power supply control unit initializes the initiated function block. As a result, the power supply control unit can perform the initial setting operation with respect to the function block whose power supply status has been changed from the power OFF-status to the power ON-status without intervention of the control by the CPU. As a consequence, it is possible to avoid that the CPU is initiated only for initializing the function block, so that the waste of power consumption can be eliminated.

In the above-described semiconductor integrated circuit, the control content stored in the power supply control unit contains supplied voltage levels corresponding to each of the plural function blocks and said CPU; and the power supply control unit performs a control operation in such a manner that power supply voltages having the supplied voltage levels indicated by the control content are applied to the plural function blocks and the CPU. As a result, in such a case that the semiconductor integrated circuit is operated only in the low speed, or only the internal status thereof is held, the operation lower limit voltage is applied to the function block, so that the power consumption can be suppressed.

In the above-described semiconductor integrated circuit, the control content stored in the power supply control unit contains substrate bias voltage levels corresponding to each of the plural function blocks and the CPU; and the power supply control unit performs a control operation in such a manner that substrate bias voltages having the substrate bias voltage levels indicated by the control content are applied to the plural function blocks and the CPU. Accordingly, in such a case that the semiconductor integrated circuit is operated only in the low speed, or only the internal status thereof is held, the substrate bias voltage which constitutes the threshold value is increased so as to suppress the leak current, so that the power consumption can be suppressed.

In the above-described semiconductor integrated circuit, the control content stored in the power supply control unit is rewritable via the CPU. As a result, the general-purpose characteristic of the system LSI can be increased.

In the above-described semiconductor integrated circuit, the above-described plurality of function blocks and the plurality of switch units have been fabricated in a single chip. As a result, the semiconductor integrated circuit can be properly adapted to the production of the system LSI.

Also, the present invention is to provide an electric power supply controlling method featured by that in such an electric power supply controlling method for a semiconductor integrated circuit equipped with: a plurality of functions; a CPU (central processing unit); a power supply control unit to which electric power of a power supply is continuously supplied, and which controls supplying of electric power of the power supply to the plurality of function blocks and the CPU; and a plurality of switch units controlled by the power supply control unit, for switching an electric power supplying operation of the power supply and an electric power cutting off operation thereof with respect to each of the plural function blocks and the CPU; the electric power supply controlling method for the semiconductor integrated circuit is comprised of: a reception step in which the power supply control unit receives the interrupt issued from each of the plural function blocks, or the instruction issued from the CPU; a power supply control step in which in response to either an interrupt issued from any one of the plural function blocks or an instruction issued from the CPU, the power supply control unit controls each of the plural switch units; and an initiation step for initiating at least one of the plural function blocks and the CPU.

In the above-described electric power supply controlling method, in the power supply control step, the plurality of switch units are controlled based upon a control content corresponding to either an interrupt issued from any one of the plural functions or an instruction issued from the CPU, which is stored in the power supply control unit; and in the initiation step, at least one of the plural function blocks and the CPU is initiated based upon the control content.

In the above-described electric power supply controlling method, the electric power supply controlling method is further comprised of: a power supply cutoff solving step in which the power supply control unit drives a power supply cutoff solving unit for varying a signal which is inputted from one function block to another function block, which are contained in the plural function blocks, and the power supply control units forcibly fixes a level of a signal to a low level, while the signal is propagated from a function block whose power supply is cut off to a function block to which electric power of the power supply is supplied.

In the above-described electric power supply controlling method, in the initiation step, the power supply control unit switches the plurality of switch units in the power supply control step, and after a predetermined time has elapsed, the power supply control unit initiates at least one of the plural function blocks and the CPU.

In the above-described electric power supply controlling method, an interrupt issued from any one of the plural function blocks contains both a formal interrupt and a provisional interrupt which is issued prior to the formal interrupt; and in the power supply control step, the power supply control unit starts to supply electric power of the power supply with respect to at least one of the plural function blocks and the CPU, which will be subsequently initiated, in response to the provisional interrupt.

In the above-described electric power supply controlling method, in the initiation step, in such a case that even when a counted time of a timer unit for starting a time counting operation in response to the provisional interrupt has elapsed a predetermined time, the formal interrupt is not issued, the power supply control unit initiates the CPU.

In the above-described electric power supply controlling method, the power supply control step includes an initializing data transfer step in which after the electronic power supply control operation is carried out, the power supply control unit transfers initializing data for initializing a function block which will be subsequently initiated, so as to initialize the initiated function block.

In the above-described electric power supply controlling method, the control content stored in the power supply control unit contains supplied voltage levels corresponding to each of the plural function blocks and the CPU; and in the power supply control step, the power supply control unit performs a control operation in such a manner that power supply voltages having the supplied voltage levels indicated by the control content are applied to the plural function blocks and the CPU.

In the above-described electric power supply controlling method, the control content stored in the power supply control unit contains substrate bias voltage levels corresponding to each of the plural function blocks and the CPU; and in the power supply control step, the power supply control unit performs a control operation in such a manner that substrate bias voltages having the substrate bias voltage levels indicated by the control content are applied to the plural function blocks and the CPU.

In accordance with the semiconductor integrated circuit and the electric power supply controlling method thereof, related to the present invention, the power consumption of the CPU domain during the operation mode can be reduced. Also, since the recovery operation from the power supply cutoff status can be carried out in a high speed, in an electronic appliance which mounts the above-described semiconductor integrated circuit, an improvement in responses can be realized.

BRIEF DESCRIPTION OF THE DRAWINGS

FIG. 12 is a diagram for representing a content of an interrupt power supply control table employed in a seventh embodiment mode of the present invention.

DESCRIPTION OF THE PREFERRED EMBODIMENTS

Referring now to drawings, a description is made of various embodiment modes as to a semiconductor integrated circuit and an electric power supply controlling method thereof, according to the present invention. The below-mentioned semiconductor integrated circuits of the embodiment modes are applied to system LSIs which are provided in electronic appliances such as portable telephones which require low power consumption.

First Embodiment Mode

Figures 1, 2:
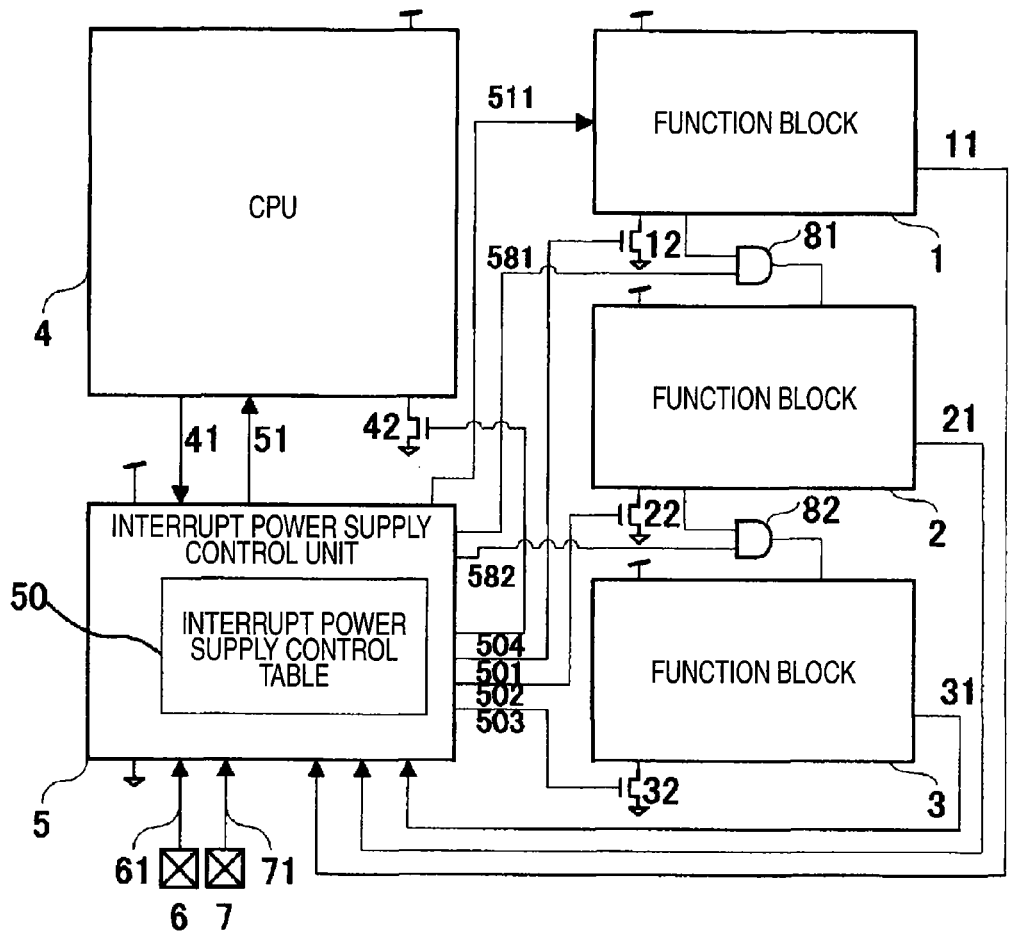
FIG. 1 is a block diagram for showing an arrangement of a semiconductor integrated circuit according to a first embodiment mode of the present invention.
FIG. 2 is a diagram for representing a content of an interrupt power supply control table employed in the first embodiment mode.

FIG. 1 is a block diagram for representing a semiconductor integrated circuit according to a first embodiment mode of the present invention. The semiconductor integrated circuit of the first embodiment mode contains macroblocks (function blocks) 1, 2, 3 having specific functions; a CPU 4; an interrupt power supply control unit 5; and power supply cutoff solution elements 81, 82. The interrupt power supply control unit 5 has a function capable of controlling interrupts issued from the function blocks 1, 2, 3, and further, another function capable of controlling supplies of electric power from a power supply to the function blocks 1, 2, 3 and the CPU 4. The power supply cutoff solution elements 81 and 82 prevent feedthrough currents produced when the power supply is cut off.

Currents of the power supply are supplied via individual power supply switches 12, 22, 32, and 42 to the above-described function blocks 1, 2, 3, and the CPU 4 respectively. On the other hand, a current of the power supply is continuously supplied to the interrupt power supply control unit 5. To the interrupt power supply control unit 5, signal lines have been connected through which interrupts 11, 21, 31 from the function blocks 1, 2, 3 are transferred, a power supply control instruction 41 from the CPU 4 is transferred, and also, input (interrupts) 61, 71 from external terminals 6, 7 are transferred. To the CPU 4, a signal line has been connected through which an interrupt 51 from the interrupt power supply control unit 5 is transferred.

While the interrupt power supply control unit 5 contains a recording medium, an interrupt power supply control table 50 has been recorded on the recording medium. FIG. 2 is a diagram for showing a content of the interrupt power supply control table 50 employed in the first embodiment mode. The interrupt power supply control table 50 has stored thereinto ON/OFF control contents as to the function blocks 1, 2, 3, and the power supply switches 12, 22, 32, 42 of the CPU 4; and also, information about blocks which will be subsequently initiated every the interrupts 11, 21, 31, 61, 71, and the power supply control instruction 41. The contents of the interrupt power supply control table 50 are rewritable (programmable) via the CPU 4.

Upon receipt of either the interrupts 11, 21, and 31 issued from the functional blocks 1, 2, and 3 or the power supply control instruction 41, the interrupt power supply control unit 5 outputs ON/OFF control signals 501, 502, 503, 504 with respect to the power supply switches 12, 22, 32, 42, and initiates the blocks which will be subsequently operated in accordance with the contents of the interrupt power supply control table 50.

The power supply cutoff solution elements 81 and 82 are inserted between signals which are propagated among the function blocks 11, 21, 31. When a potential of such a signal outputted from such a function block whose power supply is interrupted becomes an intermediate potential, a feedthrough current flows through a function block which receives the signal having the intermediate potential. As a consequence, the interrupt power supply control unit 5 outputs control signals 581 and 582 to the power supply interrupt solution elements 81 and 82 in response to a power supply mode so as to forcibly fix a level of a signal to a low level ("L" level), while this signal is transferred from a power supply cutoff block to an electric power supply block.

When the power supply is turned ON, the electric power of the power supply has been supplied only to the interrupt power supply control unit 5, and the power supply switches 12, 22, 32, 42 are controlled in such a manner that all of these power supply switches 12, 22, 32, 42 are turned OFF. At this time, the entire system of the semiconductor integrated circuit is under standby status.

When an interrupt 61 is inputted from an external terminal 6, the interrupt power supply control unit 5 refers to a content of a row as to the interrupt 61 of the interrupt power supply control table 50. In the row as to this interrupt 61, the power supply of the CPU 4 is turned ON; the power supply of the function block 1 is turned ON; the power supply of the function block 2 is turned ON; and also, the power supply of the function block 3 is turned OFF. As a consequence, the interrupt power supply control unit 5 outputs signals having high levels ("H" levels) to the power supply switches 12, 22, 42 so as to turn ON the function blocks 1 and 2, and also, the power supply of the CPU 4. On the other hand, since outputting of a signal having a low level ("L" level) to the power supply switch 32 is maintained, the power supply of the function block 3 remains under OFF status. Then, since the block which will be subsequently operated corresponds to the CPU 4, the interrupt power supply control unit 5 releases resetting of the CPU 4 so as to initiate the CPU 4.

As previously described, since the contents of the interrupt power supply control table 50 can be rewritten via the CPU 4, after the CPU 4 has been initiated, the contents of the interrupt power supply control table 50 can be rewritten in correspondence with an application program which is wanted to be executed.

Figure 3:
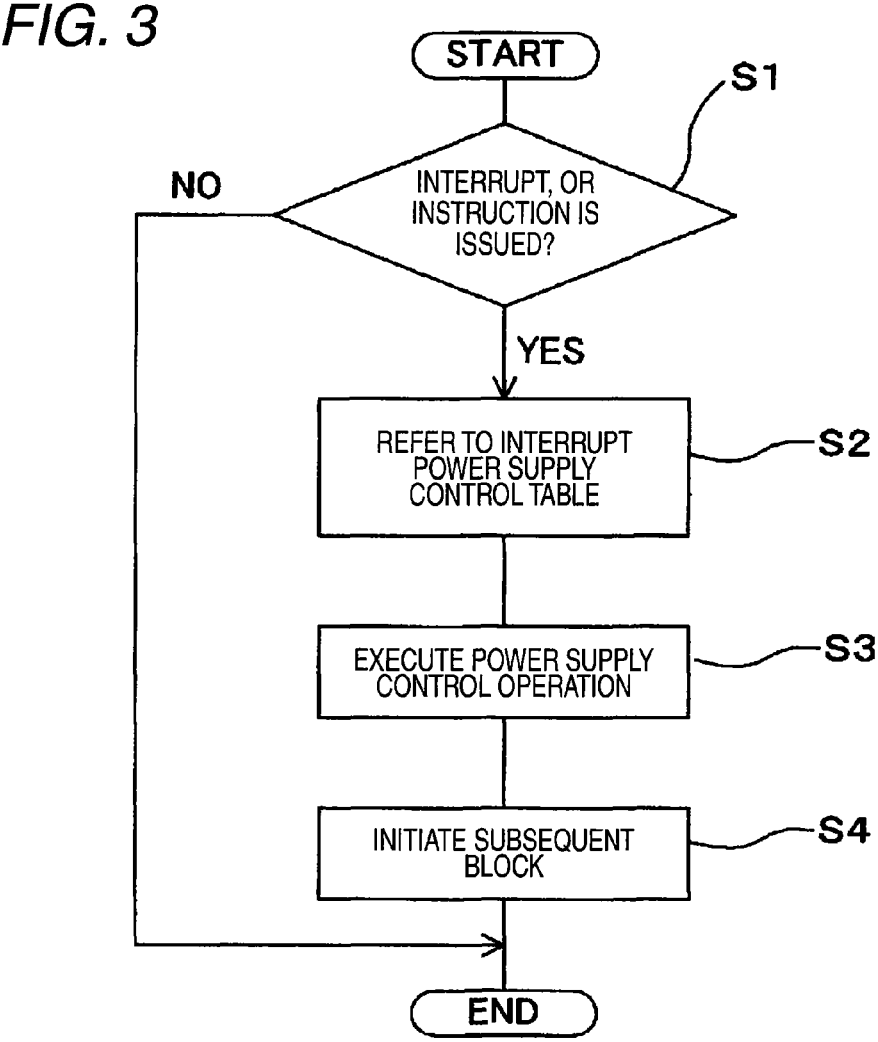
FIG. 3 is a flow chart for describing an operation sequence (electric power supply controlling method) of an interrupt power supply control unit employed in the first embodiment mode.

FIG. 3 is a flow chart for describing an operation sequence (electric power supply controlling method) of the interrupt power supply control unit 5 of the semiconductor integrated circuit according to the first embodiment mode. This operation is repeatedly executed every time predetermined timing occurs. Firstly, while the interrupt power control unit 5 monitors a power supply control instruction 41 issued from the CPU 4 and interrupts 11, 21, 31 issued from the function blocks 1, 2, 3, the interrupt power supply control unit 5 judges whether or not the interrupts 11, 21, 31, or the instruction 41 are present (step S1). When either the interrupts 11, 21, 31 or the instruction 41 are issued, the interrupt power supply control unit 5 refers to the interrupt power supply control table 50 (step S2), and performs a power supply control operation in accordance with the content of the interrupt power supply control table 50 (step S3). In this power supply control operation, the interrupt power supply control unit 5 controls the above-described turn-ON operations of the power supply switches 12, 22, 32, 42, and also, outputs the control signals 581 and 582 to the power supply cutoff solution elements 81 and 82. When electric power of the power supply is supplied to a necessary function block by performing this power supply control operation, in accordance with such a content of a column 50*b* (shown in FIG. 2) of a function block of the interrupt power supply control table 50, which will be subsequently initiated, the interrupt power supply control unit 5 initiates the relevant function block (step S4). Thereafter, the interrupt power supply control unit 5 accomplishes the above-described sequential operation. On the other hand, in such a case that either the interrupts 11, 21, 31 or the instruction 41 are not issued in the step S1, the interrupt power supply control unit 5 directly accomplishes the above-described sequential operation.

As an example in which the power supply cutoff operation of the CPU 4 during an operation mode is carried out, an application program which does not require a process operation of the CPU 4 is represented. For instance, this application program indicates such a case that while the function block 1 has a DMA (Direct Memory Access) function and the function block 2 has an audio decode function, the function block 1 transfers music data from an external memory to the function block 2, and then, this function block 2 reproduces music data.

In this case, the CPU 4 writes the following data in the row as to the power supply control instruction 41 of the interrupt power supply control table 50: the power supply of the CPU 4 is turned OFF; the power supplies of the function blocks 1 and 2 are turned ON; the power supply of the function block 3 is turned OFF; and as the function block which will be subsequently initiated, the function block 1 is written. Then, the CPU 4 issues a power supply control instruction 41. The interrupt power supply control unit 5 maintains levels of signals at high (H) levels, which are supplied to the power supply switches 12 and 22, and also, outputs signals having low (L) levels to the power supply switches 32 and 42 in accordance with the contents of the interrupt power supply control table 50. Furthermore, the interrupt power supply control unit 5 initiates the function block 1 after the above-described power supply control operation is accomplished.

When the function block 1 is initiated, the DMA transfer operation is commenced, so that music is reproduced. In such a case that after the music reproducing operation is accomplished, the CPU 4 is wanted to be initiated, such data have been previously described in the row as to the interrupt 11 of the interrupt power supply control table 50: namely, the power supply of the CPU 4 is turned ON, and as the block which will be subsequently initiated, the CPU 4 is written. As a result, after the music reproducing operation has been performed, since the interrupt 11 indicative of the completion of the DMA transfer operation is issued from the function block 1, the power supply of the CPU 4 is turned ON, and resetting of the CPU 4 is released, so that the CPU 4 is initiated.

Also, in the case that there is no application program and the system of the semiconductor integrated circuit is wanted to be transferred to a standby status, the CPU 4 issues such a power supply control instruction 41 which describes the following data in the row as to the instruction 41 of the interrupt power supply control table 50: namely, the power supplies of the CPU 4 and the function blocks 1, 2, 3 are turned ON. In this case, such a content which is written in the column 50b (shown in FIG. 2) of the block which will be subsequently initiated becomes "don't care." In accordance with the content of the interrupt power supply control table 50, the interrupt power supply control unit 5 outputs signals having low levels ("L" levels) to the power supply switches 12, 32, 32, 42. As a consequence, the system of the semiconductor integrated circuit is brought into a standby status.

As previously described, in accordance with the semiconductor integrated circuit and the electric power supply controlling method thereof of the first embodiment mode, the power supply of the CPU 4 during such an operation mode that the process operation by the CPU 4 is not required can be set to the OFF status. As a consequence, the power consumption of the CPU domain can be reduced, so that the power consumption as to the entire system of the semiconductor integrated circuit can be reduced.

Second Embodiment Mode

Figure 4:
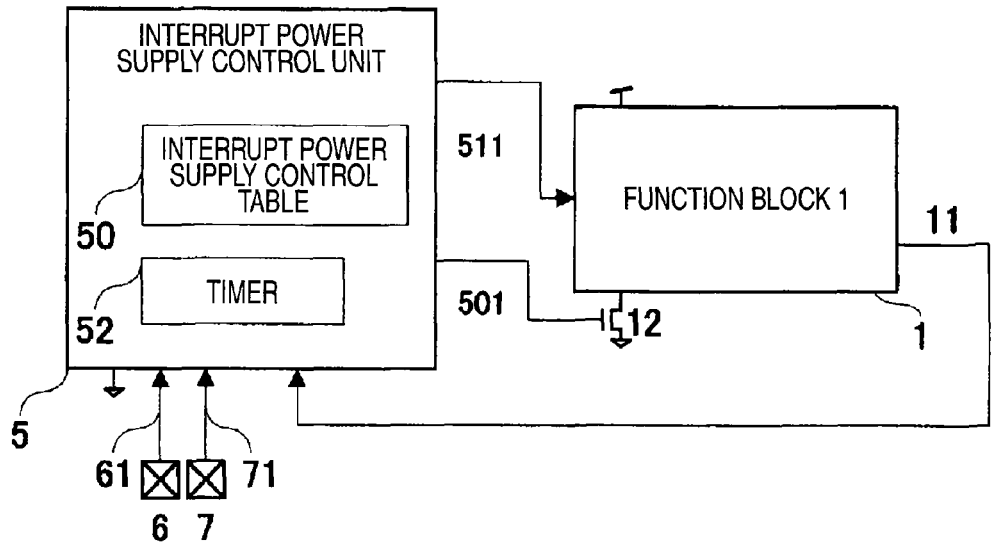
FIG. 4 is a block diagram for representing an arrangement of a major unit of a semiconductor integrated circuit according to a second embodiment mode of the present invention.

FIG. 4 is a block diagram for showing a semiconductor integrated circuit according to a second embodiment mode of the present invention. It should be understood that the same reference numerals shown in the first embodiment mode will be employed for denoting the same structural elements indicated in the second embodiment mode, and therefore, descriptions thereof will be omitted. For the sake of easy understandings, FIG. 4 represents only an arrangement of a major unit of the semiconductor integrated circuit according to the second embodiment mode. In the second embodiment mode, a timer 52 has been built in the interrupt power supply control unit 5. The timer 52 counts power supply stable waiting times which are different from each other with respect to each of semiconductor processes, while setting times of the timer 52 can be rewritten (programmable) via the CPU 4.

The second embodiment mode represents such a case that the function block 1 is initiated by an interrupt 61 supplied from the external terminal 6. When the interrupt power supply control unit 5 receives the interrupt 61 supplied from the external terminal 6, the interrupt power supply control unit 5 refers to the interrupt power supply control table 50, and sets a level of a signal 501 to a high (H) level, while the signal 501 controls the power supply switch 12 of the function block 1. At the same time, the interrupt power supply control unit 5 commences the counting operation of the built-in timer 52. When a counted value exceeds the set time of the timer 52 and the timer 52 is brought into an overflow status, the interrupt power supply control unit 5 refers to the column 50b (shown in FIG. 2) of the block of the interrupt power supply control table 50, which will be subsequently initiated, so as to initiate the relevant block.

In accordance with the semiconductor integrated circuit of the second embodiment mode, after the power supply control operation has been carried out and then the power supply becomes stable, such a function block which will be subsequently initiated can be firmly operated.

Third Embodiment Mode

Figure 5:
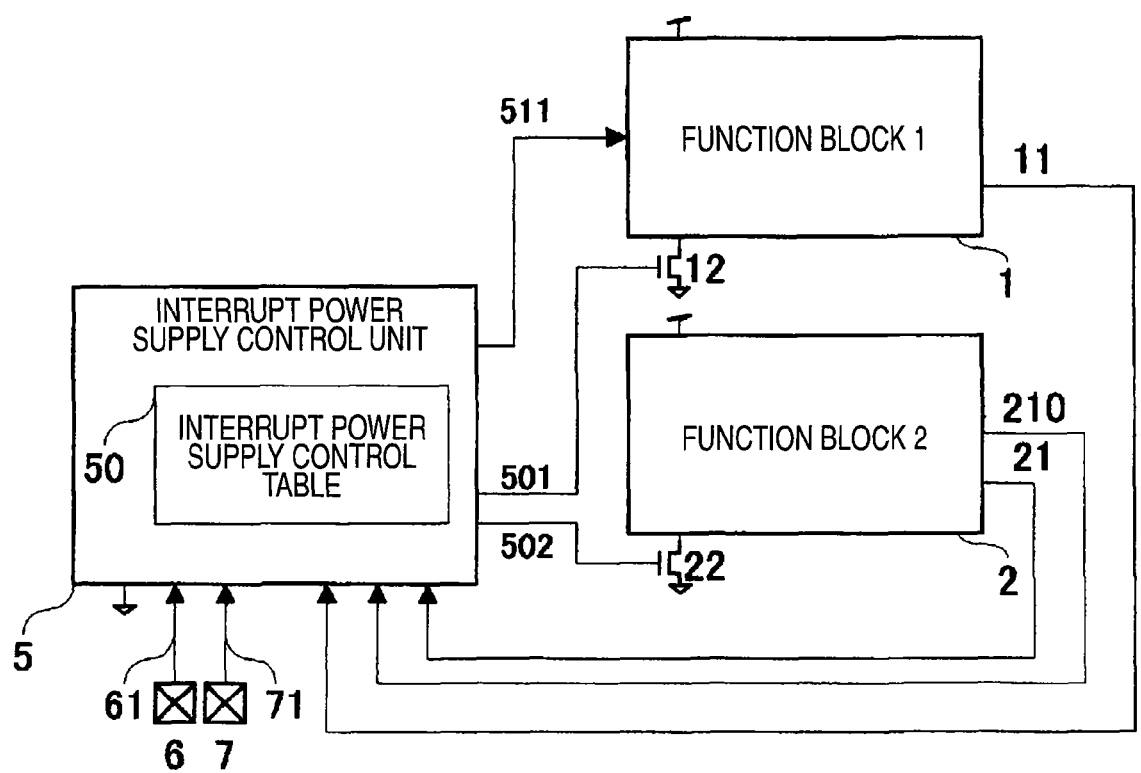
FIG. 5 is a block diagram for indicating an arrangement of a major unit of a semiconductor integrated circuit according to a third embodiment mode of the present invention.

FIG. 5 is a block diagram for showing a semiconductor integrated circuit according to a third embodiment mode of the present invention. It should be understood that the same reference numerals shown in the first embodiment mode will be employed for denoting the same structural elements indicated in the third embodiment mode, and therefore, descriptions thereof will be omitted. For the sake of easy understandings, FIG. 5 represents only an arrangement of a major unit of the semiconductor integrated circuit according to the third embodiment mode. In the third embodiment mode, there is shown such a case that the function block 2 corresponds to a DMAC (DMA controller). While a threshold value of a DMA transfer operation of the function block 2 has been designed in such a manner that this threshold value can be set from the CPU 4, the function block 2 contains the following function: That is, if a DMA transfer amount exceeds the set threshold value, or a transfer remaining amount becomes lower than the set threshold value, then the function block 2 produces a provisional interrupt 210.

When the interrupt power supply control unit 5 receives the provisional interrupt 210, the interrupt power supply control unit 5 refers to the interrupt power supply control table 50, and sets a level of a signal 501 to a high (H) level, while the signal 501 controls the power supply switch 12 of the function block 1. Thereafter, when all of the DMA transfer operations are completed, the function block 2 generates a formal interrupt 21. When the interrupt power supply control unit 5 receives the formal interrupt 21, the interrupt power supply control unit 5 refers to the interrupt power supply control table 50, and sets a level of a signal 511 to a high (H) level, which initiates the function block 1, and thus, initiates the function block 1.

Figure 6:
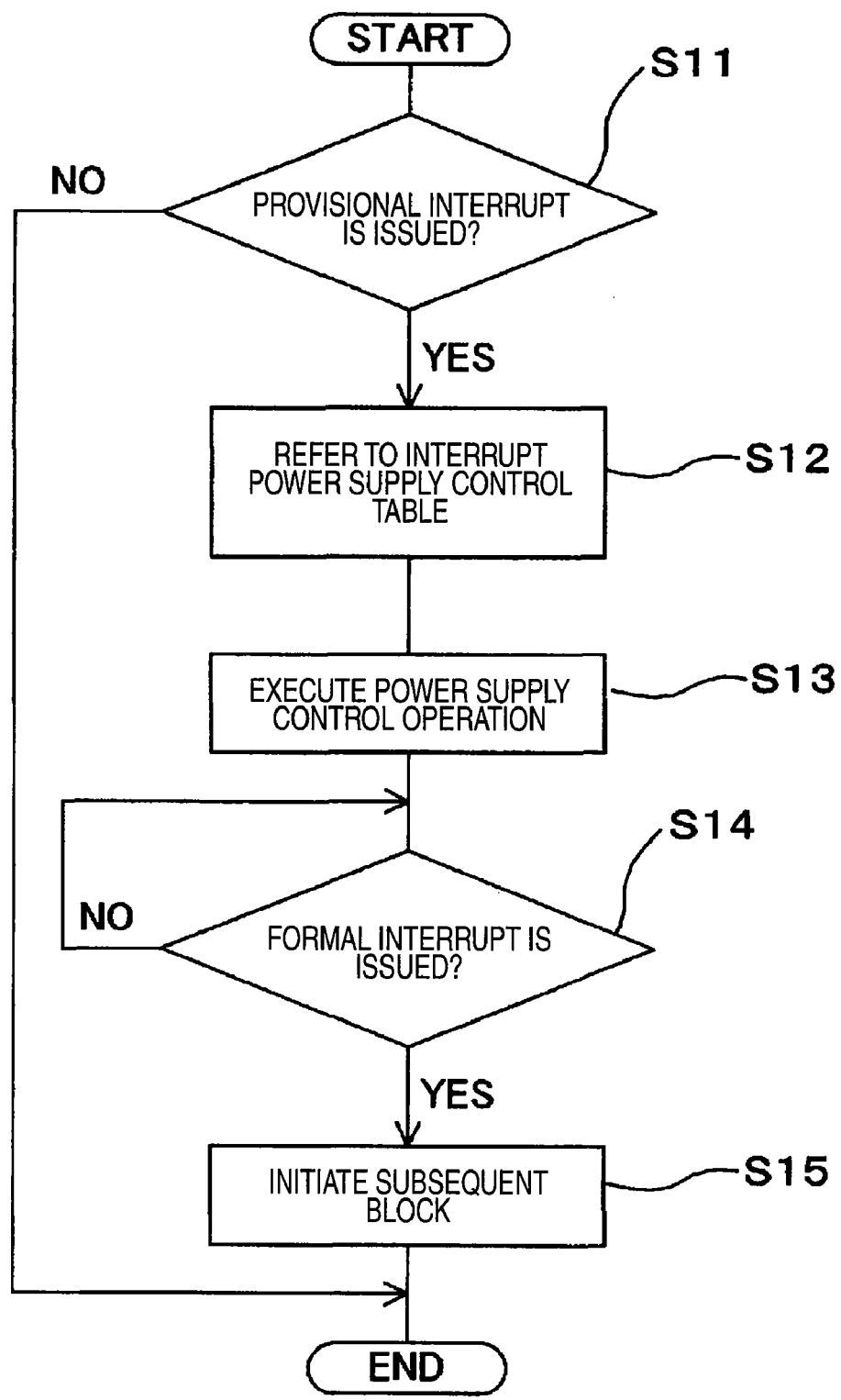
FIG. 6 is a flow chart for describing an operation sequence (electric power supply controlling method) of an interrupt power supply control unit employed in the third embodiment mode.

FIG. 6 is a flow chart for describing an operation sequence (electric power supply controlling method) of the interrupt power supply control unit 5 of the semiconductor integrated circuit according to the third embodiment mode. This operation is repeatedly executed every time predetermined timing occurs. Firstly, while the interrupt power control unit 5 monitors a provisional interrupt 210 issued from the function blocks 2, the interrupt power supply control unit 5 judges whether or not the provisional interrupt 210 is present (step S11). When the interrupt 210 is issued, the interrupt power supply control unit 5 refers to the interrupt power supply control table 50 (step S12), and performs an electric power supply control operation in accordance with the content of the interrupt power supply control table 50 (step S13). In this power supply control operation, the interrupt power supply control unit 5 controls the above-described turn-ON operations of the power supply switches 12, 22, 32, 42, and also, outputs the control signals 581 and 582 to the power supply cutoff solution elements 81 and 82. When electric power of the power supply is supplied to a necessary function block by performing this power supply control operation, while the interrupt power supply control unit 5 monitors a formal interrupt 21, this interrupt power supply control unit 5 waits until the formal interrupt 21 is issued (step S14). When this formal interrupt 21 is issued, in accordance with such a content of a column 50b (shown in FIG. 2) of a function block of the interrupt power supply control table 50, which will be subsequently initiated, the interrupt power supply control unit 5 initiates the relevant function block (step S15). Thereafter, the interrupt power supply control unit 5 accomplishes the above-described sequential operation. On the other hand, in such a case that either the provisional interrupt 210 is not present in the step S11, the interrupt power supply control unit 5 directly accomplishes the above-described sequential operation.

In accordance with the semiconductor integrated circuit of the third embodiment mode, the power supply of the function block 1 can be stabilized for a time period defined from the generation of the provisional interrupt 210 until the generation of the formal interruption 21. As a consequence, just after the formal interrupt 21 is generated, the operation of the function block 1 can be commenced, so that a time lag does not occur.

It should also be noted that as another method for stabilizing the power supply of the function block 1, it is conceivable to build a timer in the function block 2. In this alternative case, a set value of the time built in the function block 2 may be set by the CPU 4. Then, the function block 2 is initiated, and at the same time, the timer is initiated. In the case that a measuring time of the timer reaches the set value, a provisional interrupt is caused to be issued from the function block 2. After the function block 2 has accomplished the original operation, a formal interrupt is caused to be issued from the function block 2.

Fourth Embodiment Mode

Figure 7:
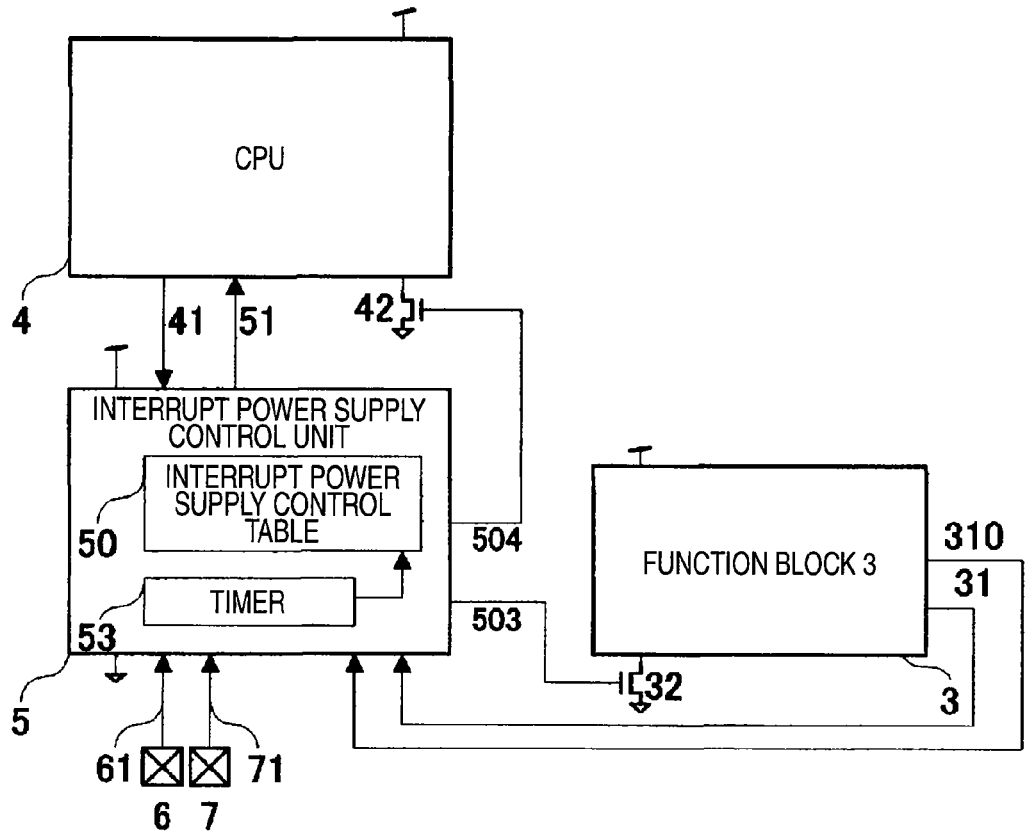
FIG. 7 is a block diagram for representing an arrangement of a major unit of a semiconductor integrated circuit according to a fourth embodiment mode of the present invention.

FIG. 7 is a block diagram for showing a semiconductor integrated circuit according to a fourth embodiment mode of the present invention. It should be understood that the same reference numerals shown in the first embodiment mode will be employed for denoting the same structural elements indicated in the fourth embodiment mode, and therefore, descriptions thereof will be omitted. For the sake of easy understandings, FIG. 7 represents only an arrangement of a major unit of the semiconductor integrated circuit according to the fourth embodiment mode. In the fourth embodiment mode, a timer 53 is built in the interrupt power supply control unit 5. When the interrupt power supply control unit 5 receives a provisional interrupt 310 issued from the functional block 3, the interrupt power supply control unit 5 starts a counting operation (time measuring operation) of the timer 53. Then, even when a counted value reaches the set value of the timer 53, if a normal interrupt 31 is not issued from the function block 3, then the interrupt power supply control unit 5 sets a level of a signal 504 to a high level ("H" level) so as to initiate the CPU 4, while the signal 504 controls the power supply switch 42 of the CPU 4.

Thereafter, the interrupt power supply control unit 5 issues an interrupt 51 to the CPU 4. Upon receipt of the interrupt 51, the CPU 4 performs an abnormal case processing operation with respect to this interrupt 51, and then outputs a power supply control instruction 41 to the interrupt power supply control unit 5. As a result, the interrupt power supply control unit 5 outputs signals having low levels ("L" levels) to the power supply switches 12, 22, 32, and 42 in accordance with the content of the interrupt power supply control table 50. Then, the system of the semiconductor integrated circuit is brought into a standby status.

In accordance with the semiconductor integrated circuit of the fourth embodiment mode, with respect to such an abnormal case that the normal interrupt is not yet received although the provisional interrupt has been received, a fail-safe function can be realized.

Fifth Embodiment Mode

Figure 8:
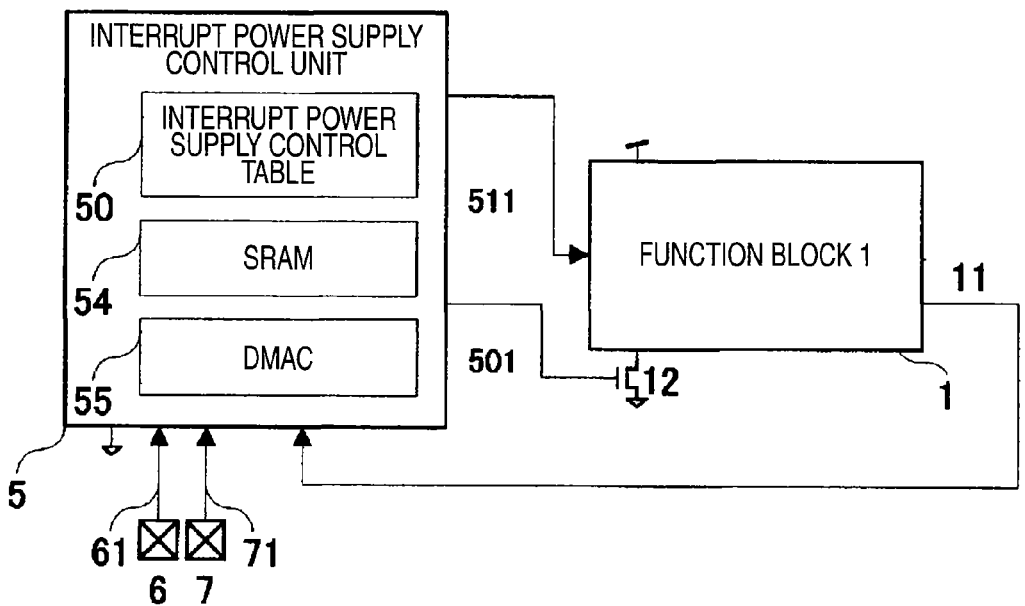
FIG. 8 is a block diagram for indicating an arrangement of a major unit of a semiconductor integrated circuit according to a fifth embodiment mode of the present invention.

FIG. 8 is a block diagram for showing a semiconductor integrated circuit according to a fifth embodiment mode of the present invention. It should be understood that the same reference numerals shown in the first embodiment mode will be employed for denoting the same structural elements indicated in the fifth embodiment mode, and therefore, descriptions thereof will be omitted. For the sake of easy understandings, FIG. 8 represents only an arrangement of a major unit of the semiconductor integrated circuit according to the fifth embodiment mode. In the fifth embodiment mode, an SRAM (Static Random Access Memory) 54 functioning as a data storage area for initializing the function clock 1 has been equipped in the interrupt power supply control unit 5. Also, a simple DMAC (DMA controller) 55 has been provided in the interrupt power supply control unit 5, while the simple DMAC 55 has only a transfer function capable of transferring initializing data from the SRAM 54 to the function block 1.

The fifth embodiment mode indicates such a case that the function block 1 is initialized so as to be initiated based upon an interrupt 61 entered from the external terminal 6. When the interrupt 61 from the external terminal 6 is generated, the interrupt power supply control unit 5 refers to the interrupt power supply control table 50, and sets a level of a signal 501 to a high (H) level, while the signal 501 controls the power supply switch 12 of the function block 1. Then, the interrupt power supply control unit 5 initiates the simple DMAC 55 built therein, and transfers the initializing data for the function block 1 stored in the SRAM 54 to the function block 1. After the transfer operation of the initializing data has been accomplished, the interrupt power supply control unit 5 sets a level of a signal 511 for initiating the function block 1 to a high level ("H" level) in order to initiate the function block 1.

Figure 9:
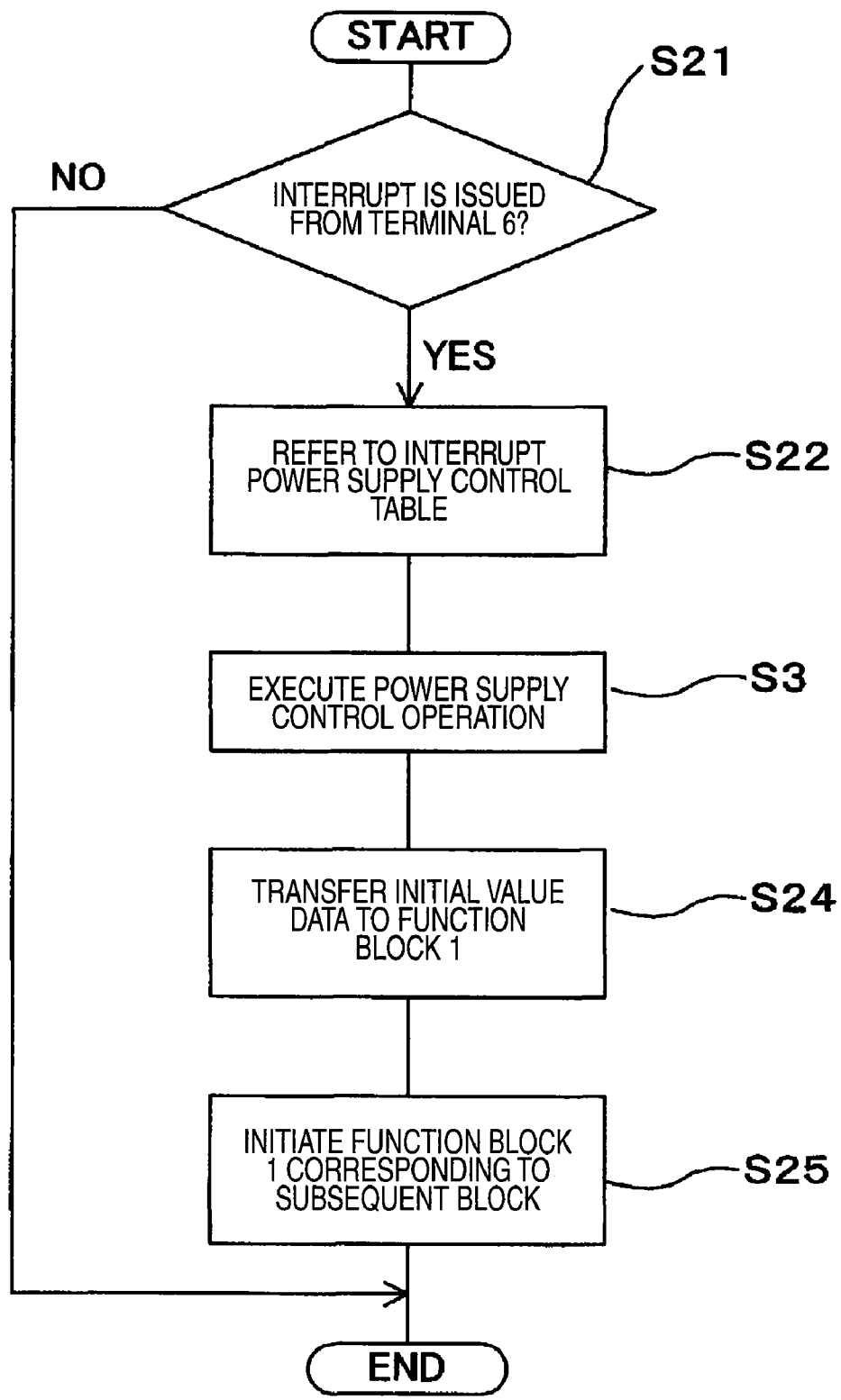
FIG. 9 is a flow chart for describing an operation sequence (electric power supply controlling method) of an interrupt power supply control unit employed in the fifth embodiment mode.

FIG. 9 is a flow chart for describing an operation sequence (electric power supply controlling method) of the interrupt power supply control unit 5 of the semiconductor integrated circuit according to the fifth embodiment mode. This operation is repeatedly executed every time predetermined timing occurs. Firstly, while the interrupt power control unit 5 monitors the interrupt 61 supplied from the external terminal 6, the interrupt power supply control unit 5 judges whether or not the interrupt 61 is present (step S21). When the interrupt 61 is issued, the interrupt power supply control unit 5 refers to the interrupt power supply control table 50 (step S22), and performs an electric power supply control operation in accordance with the content of the interrupt power supply control table 50 (step S23). When electric power of the power supply is supplied to the function block 1 corresponding to such a block required by the above-described electric power control operation, the interrupt power supply control unit 5 initiates the simple DMAC 55 so as to transfer the initializing data stored in the SRAM 54 to the function block 1 (step S24). The interrupt power supply control unit 5 initiates the function block 1 described in the column 50b of the interrupt power supply control table 50 as to the block which will be subsequently initiated (step S25). Thereafter, the interrupt power supply control unit 5 accomplishes the above-described sequential operation. On the other hand, in such a case that either the interrupt 61 is not present in the step S21, the interrupt power supply control unit 5 directly accomplishes the above-described sequential operation.

In accordance with the semiconductor integrated circuit of the fifth embodiment mode, the interrupt power supply control unit 5 can perform the initial setting operation of the function block 1 whose status has been changed from the power supply OFF status to the power supply ON status without intervention of the control by the CPU 4. As a consequence, there is no need for initializing the CPU 4 in order only to initialize the function block 1. As a result, a waste of power consumption can be eliminated.

Sixth Embodiment Mode

A sixth embodiment mode of the present invention shows such a case that as an electric power control method of a semiconductor integrated circuit, when a low-speed operation is performed, or only holding of an internal status is carried out with respect to the semiconductor integrated circuit, a lower limit operating voltage is applied in order to suppress power consumption of the semiconductor integrated circuit.

Figures 10, 11:
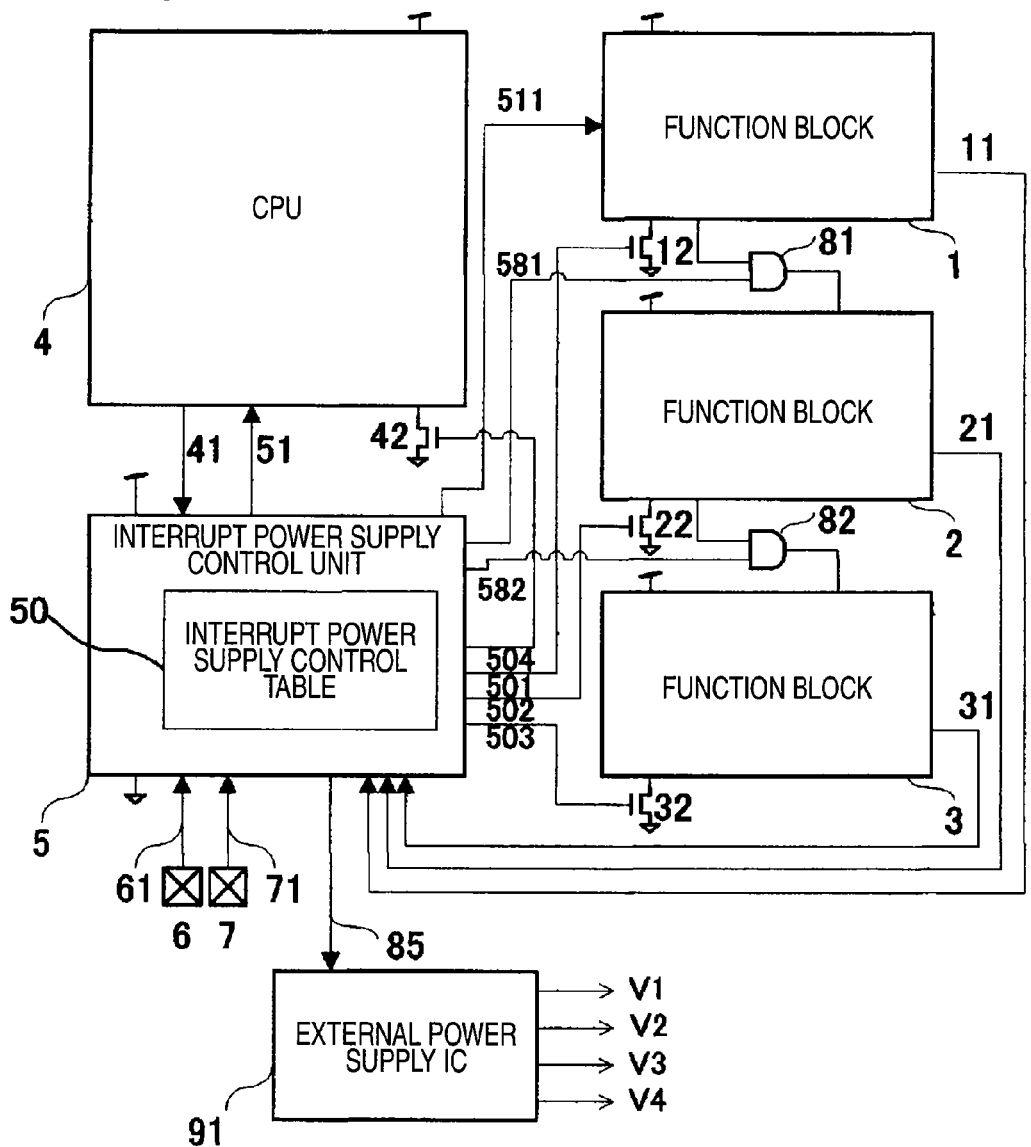
FIG. 10 is a block diagram for showing an arrangement of a semiconductor integrated circuit according to a sixth embodiment mode of the present invention.
FIG. 11 is a diagram for representing a content of an interrupt power supply control table employed in the sixth embodiment mode.

FIG. 10 is a block diagram for showing a semiconductor integrated circuit according to the sixth embodiment mode of the present invention. It should be understood that the same reference numerals shown in the first embodiment mode will be employed for denoting the same structural elements indicated in the sixth embodiment mode, and therefore, descriptions thereof will be omitted. In the semiconductor integrated circuit of the sixth embodiment mode, a regulator has been mounted in an external power supply IC 91 which supplies voltages of a power supply to the respective circuit blocks. The external power supply IC 91 can freely adjust the power supply voltages V1, V2, V3, V4, which are applied to the function blocks 1, 2, 3, and the CPU 4 respectively, in accordance with a control signal derived from the interrupt power supply control unit 5.

FIG. 11 is a diagram for sowing an interrupt power supply control table 50 employed in the sixth embodiment mode. The interrupt power supply control table 50 shown in FIG. 11 represents that when the power supply IC 91 is controlled to be turned ON, a normal operation voltage is 1.2 V, and an operation lower limit voltage is 0.9 V. In such a case that the power supply IC 91 is controlled to be turned ON during the normal operation, a voltage applied from the power supply IC 91 is 1.2 V. It is so assumed that an interrupt 21 is issued under this condition.

The interrupt power supply control unit 5 refers to a row as to the interrupt 21 contained in the interrupt power supply control table 50 shown in FIG. 11. The row of the interrupt 21 shown in FIG. 11 describes the following data: namely, the voltage level of the CPU 4 is 1.2 V; the power supplies of the function blocks 1 and 2 are turned OFF; and the voltage level of the function block 3 is 0.9 V.

The interrupt power supply control unit 5 outputs a level conversion request 85 to the power supply IC 91 in such a manner that a voltage to be applied to the function block 3 becomes the operation lower limit voltage. When the power supply IC 91 receives this level conversion request 85, the power supply IC 91 drops the voltage V3 to be applied to the function block 3 from 1.2 V to 0.9 V. Thereafter, the interrupt power supply control unit 5 initiates the CPU 4 in accordance with such a content of a column 50b of a function block of the interrupt power supply control table 50, which will be subsequently initiated.

As previously explained, in accordance with the semiconductor integrated circuit of the sixth embodiment mode, in such a case that the low-speed operation is carried out, or only the internal status is held with respect to the semiconductor integrated circuit, the operation lower limit voltage is applied to the function block, so that the power consumption can be suppressed.

Seventh Embodiment Mode

A seventh embodiment mode of the present invention indicates such a case that as an electric power supply controlling method for a semiconductor integrated circuit, a threshold voltage control operation is carried out. Generally speaking, when a semiconductor integrated circuit is operated in a high speed, a threshold voltage is decreased so as to perform switching operations of MOS transistors in high speeds. On the other hand, in such a case that either a low speed operation or only holding of internal statuses is performed with respect to the semiconductor integrated circuit, the threshold voltage is increased so as to suppress a leak current.

In the semiconductor integrated circuit according to the seventh embodiment mode, the same reference numerals shown in the first embodiment mode will be employed for denoting the same structural elements indicated in the fourth embodiment mode, and therefore, descriptions thereof will be omitted. Similar to the sixth embodiment mode, voltages of a power supply are applied from the power supply IC 91 to respective blocks of the semiconductor integrated circuit. In other words, power supply voltages "V1" to "V4" and a reference bias voltage (not shown) are applied from the power supply IC 91.

FIG. 12 is a diagram for showing an interrupt power supply control table 50 employed in the seventh embodiment mode. In this seventh embodiment mode, such a control for applying a ground voltage level to a substrate bias voltage of an N-channel MOS transistor will be referred to as a "zero bias control", and this voltage level is expressed as "ZBB (Zero Body Bias)." Also, such a control for applying a voltage (for instance, −1.4 V etc.) lower than, or equal to the ground voltage level to the base bias voltage of the N-channel MOS transistor, and this voltage level is expressed as "BBB (Back Body Bias)."

Under normal operation, a power supply voltage applied from an external power supply IC 91 is 1.2 V, and the substrate bias voltage is ZBB, namely 0 V. It is so conceived that an interrupt 21 is issued under this condition.

The interrupt power supply control unit 5 refers to a row as to the interrupt 21 contained in the interrupt power supply control table 50 shown in FIG. 12. The row of the interrupt 21 shown in FIG. 12 describes the following data: namely, the power supply voltage level of the CPU 4 is 1.2 V and the substrate bias voltage is ZBB; the power supplies of the function blocks 1 and 2 are turned OFF, and the substrate bias voltage is BBB; and the power supply voltage level of the function block 3 is 0.9 V and the substrate bias voltage is ZBB.

The interrupt power supply control unit 5 outputs a level conversion request to the power supply IC 91 in such a manner that the substrate bias voltages for the CPU 4 and the function block 3 become such voltages which are written in the row of the interrupt 21. Upon receipt of the level conversion request, the power supply IC 91 sets the substrate bias voltages to "ZBB", which are applied to the CPU 4 and the function block 3, and also, sets the substrate bias voltages to "BBB", which as supplied to the function blocks 1 and 2. Thereafter, in accordance with such a content of a column 50b of a function block of the interrupt power supply control table 50, which will be subsequently initiated, the interrupt power supply control unit 5 initiates the CPU 4.

As previously explained, in accordance with the semiconductor integrated circuit of the seventh embodiment mode, in such a case that the low-speed operation is carried out, or only the internal status is held with respect to the semiconductor integrated circuit, the threshold voltage is increased so as to suppress the leak current, so that the power consumption can be suppressed.

The present invention is not limited only to the above-described arrangements of the various embodiment modes, but may be applied to any arrangements capable of achieving functions defined in the scope of claims for a patent, or capable of achieving functions provided in the arrangement of the present embodiment mode.

For instance, when electric power of a power supply is supplied to a semiconductor integrated circuit, the below-mentioned method is generally employed: namely, an output voltage of a battery is level-converted by a regulator contained in an external power supply IC, and thereafter, the level-converted battery output voltage is applied to the semiconductor integrated circuit. A control switch for turning ON/OFF this battery may be built in the external power supply IC, or may be alternatively built in the semiconductor integrated circuit. Also, even in such a case that a substrate bias voltage is applied to the semiconductor integrated circuit, the following method is generally employed: namely, an output voltage of a battery is level-converted by a regulator contained in an external power supply IC, and thereafter, the level-converted battery output voltage is applied to the semiconductor integrated circuit. A control switch of the substrate bias voltage may be built in the external power supply IC, or may be alternatively contained in the semiconductor integrated circuit. Furthermore, in the above-described embodiment modes, only one block has been described in the column 50*b* (shown in FIG. 2, FIG. 11, FIG. 12) of the block of the interrupt power supply control table 50, which will be subsequently initiated. Alternatively, while a plurality of blocks are described in the column 50*b*, two, or more pieces of blocks may be initiated at the same time.

The present invention is advantageously applied to such a system LSI that low power consumption can be realized in such a manner that the power supply domain is divided every function block, and supplying/cutoff of the electric power of the power supply to the respective function blocks are controlled in response to the application program to be executed. More specifically, the present invention is advantageously applied to electronic appliances such as portable telephones which necessarily require low power consumption.

What is claimed is:

1. A semiconductor integrated circuit, comprising:
   a plurality of function blocks;
   a CPU;
   a power supply control unit to which electric power of a power supply is continuously supplied, and which controls supplying of electric power of the power supply to said plurality of function blocks and said CPU;
   a plurality of switch units controlled by said power supply control unit, for switching an electric power supplying operation of the power supply and an electric power cutting off operation thereof with respect to each of said plurality of function blocks and said CPU; and
   a power supply cutoff solving unit for varying a signal which is inputted from one function block to another function block, which are contained in said plurality of function blocks, wherein:
   said power supply control unit stores a control content corresponding to either an interrupt issued from any one of said plurality of function blocks or an instruction issued from said CPU,
   in response to one of said control contents, said power supply control unit controls each of said plurality of switch units so as to initiates at least one of said plurality of function blocks and said CPU, and
   said power supply control unit controls said power supply cutoff solving unit in such a manner that a level of a signal is forcibly fixed to a low level, while said signal is propagated from a function block whose power supply is cut off to a function block to which electric power of the power supply is supplied.

2. The semiconductor integrated circuit as claimed in claim 1, wherein:
   said control content stored in said power supply control unit contains supplied voltage levels corresponding to each of said plurality of function blocks and said CPU, and
   said power supply control unit performs a control operation in such a manner that power supply voltages having the supplied voltage levels indicated by said control content are applied to said plurality of function blocks and said CPU.

3. The semiconductor integrated circuit as claimed in claim 1, wherein said control content stored in said power supply control unit is rewritable via said CPU.

4. The semiconductor integrated circuit as claimed in claim 1, wherein:
   said plurality of function blocks and said plurality of switch units have been fabricated in a single chip.

5. A semiconductor integrated circuit, comprising:
   a plurality of function blocks;
   a CPU;
   a power supply control unit to which electric power of a power supply is continuously supplied, and which controls supplying of electric power of the power supply to said plurality of function blocks and said CPU; and
   a plurality of switch units controlled by said power supply control unit, for switching an electric power supplying operation of the power supply and an electric power cutting off operation thereof with respect to each of said plurality of function blocks and said CPU; wherein:
   said power supply control unit stores a control content corresponding to either an interrupt issued from any one of said plurality of function blocks or an instruction issued from said CPU,
   in response to one of said control contents, said power supply control unit controls each of said plurality of switch units so as to initiates at least one of said plurality of function blocks and said CPU, and
   said power supply control unit switches said plurality of switch units, and after a predetermined time has elapsed, said power supply control unit initiates at least one of said plurality of function blocks and said CPU.

6. A semiconductor integrated circuit, comprising:
   a plurality of function blocks;
   a CPU;
   a power supply control unit to which electric power of a power supply is continuously supplied, and which controls supplying of electric power of the power supply to said plurality of function blocks and said CPU; and
   a plurality of switch units controlled by said power supply control unit, for switching an electric power supplying operation of the power supply and an electric power cutting off operation thereof with respect to each of said plurality of function blocks and said CPU; wherein:
   said power supply control unit stores a control content corresponding to either an interrupt issued from any one of said plurality of function blocks or an instruction issued from said CPU,
   in response to one of said control contents, said power supply control unit controls each of said plurality of switch units so as to initiates at least one of said plurality of function blocks and said CPU,
   an interrupt issued from any one of said plurality of function blocks contains both a formal interrupt and a provisional interrupt which is issued prior to said formal interrupt, and
   said power supply control unit starts to supply electric power of the power supply with respect to at least one of said plurality of function blocks and said CPU, which will be subsequently initiated, in response to said provisional interrupt.

7. The semiconductor integrated circuit as claimed in claim 6, further comprising:
a timer unit for starting a time counting operation in response to said provisional interrupt,
wherein in such a case that said formal interrupt is not issued even when a counted time of said timer unit has elapsed a predetermined time, said power supply control unit initiates said CPU.

8. A semiconductor integrated circuit, comprising:
a plurality of function blocks;
a CPU;
a power supply control unit to which electric power of a power supply is continuously supplied, and which controls supplying of electric power of the power supply to said plurality of function blocks and said CPU;
a plurality of switch units controlled by said power supply control unit, for switching an electric power supplying operation of the power supply and an electric power cutting off operation thereof with respect to each of said plurality of function blocks and said CPU;
a storage unit for storing thereinto initializing data used to initialize one of said function blocks; and
a transferring unit for transferring said initializing data to a function block which will be subsequently initiated, wherein:
said power supply control unit stores a control content corresponding to either an interrupt issued from any one of said plurality of function blocks or an instruction issued from said CPU,
in response to one of said control contents, said power supply control unit controls each of said plurality of switch units so as to initiates at least one of said plurality of function blocks and said CPU, and
after said power supply control unit controls supplying of electric power of the electric power supply, said power supply control unit initializes said one of said function blocks initiated.

9. A semiconductor integrated circuit, comprising:
a plurality of function blocks;
a CPU;
a power supply control unit to which electric power of a power supply is continuously supplied, and which controls supplying of electric power of the power supply to said plurality of function blocks and said CPU; and
a plurality of switch units controlled by said power supply control unit, for switching an electric power supplying operation of the power supply and an electric power cutting off operation thereof with respect to each of said plurality of function blocks and said CPU; wherein:
said power supply control unit stores a control content corresponding to either an interrupt issued from any one of said plurality of function blocks or an instruction issued from said CPU,
in response to one of said control contents, said power supply control unit controls each of said plurality of switch units so as to initiates at least one of said plurality of function blocks and said CPU,
said control content stored in said power supply control unit contains substrate bias voltage levels corresponding to each of said plurality of function blocks and said CPU, and
said power supply control unit performs a control operation in such a manner that substrate bias voltages having the substrate bias voltage levels indicated by said control content are applied to said plurality of function blocks and said CPU.

10. An electric power supply controlling method for a semiconductor integrated circuit equipped with:
a plurality of function blocks;
a CPU,
a power supply control unit to which electric power of a power supply is continuously supplied, and which controls supplying of electric power of the power supply to said plurality of function blocks and said CPU; and
a plurality of switch units controlled by said power supply control unit, for switching an electric power supplying operation of the power supply and an electric power cutting off operation thereof with respect to each of said plurality of function blocks and said CPU,
the method comprising steps of:
a reception step in which said power supply control unit receives and stores an interrupt issued from each of said plurality of function blocks, or an instruction issued from said CPU;
a power supply control step in which in response to a control content corresponding to either said interrupt issued from any one of said plurality of function blocks or said instruction issued from said CPU, said power supply control unit controls each of said plurality of switch units;
an initiation step for initiating at least one of said plurality of function blocks and said CPU based upon said control content; and
a power supply cutoff solving step in which said power supply control unit drives a power supply cutoff solving unit for varying a signal which is inputted from one function block to another function block, which are contained in said plurality of function blocks, and said power supply control units forcibly fixes a level of a signal to a low level, while said signal is propagated from a function block whose power supply is cut off to a function block to which electric power of the power supply is supplied.

11. The electric power supply controlling method for a semiconductor integrated circuit as claimed in claim 10, wherein:
said control content stored in said power supply control unit contains supplied voltage levels corresponding to each of said plurality of function blocks and said CPU, and
in said power supply control step, said power supply control unit performs a control operation in such a manner that power supply voltages having the supplied voltage levels indicated by said control content are applied to said plurality of function blocks and said CPU.

12. An electric power supply controlling method for a semiconductor integrated circuit equipped with:
a plurality of function blocks;
a CPU (central processing unit);
a power supply control unit to which electric power of a power supply is continuously supplied, and which controls supplying of electric power of the power supply to said plurality of function blocks and said CPU; and
a plurality of switch units controlled by said power supply control unit, for switching an electric power supplying operation of the power supply and an electric power cutting off operation thereof with respect to each of said plurality of function blocks and said CPU,
the method comprising steps of:
a reception step in which said power supply control unit receives and stores an interrupt issued from each of said plurality of function blocks, or an instruction issued from said CPU;

a power supply control step in which in response to a control content corresponding to either said interrupt issued from any one of said plurality of function blocks or said instruction issued from said CPU, said power supply control unit controls each of said plurality of switch units; and an initiation step for initiating at least one of said plurality of function blocks and said CPU based upon said control content, wherein:

in said initiation step, said power supply control unit switches said plurality of switch units in said power supply control step, and after a predetermined time has elapsed, said power supply control unit initiates at least one of said plurality of function blocks and said CPU.

13. An electric power supply controlling method for a semiconductor integrated circuit equipped with:

a plurality of function blocks;

a CPU (central processing unit);

a power supply control unit to which electric power of a power supply is continuously supplied, and which controls supplying of electric power of the power supply to said plurality of function blocks and said CPU; and a plurality of switch units controlled by said power supply control unit, for switching an electric power supplying operation of the power supply and an electric power cutting off operation thereof with respect to each of said plurality of function blocks and said CPU, the method comprising steps of:

a reception step in which said power supply control unit receives and stores an interrupt issued from each of said plurality of function blocks, or an instruction issued from said CPU;

a power supply control step in which in response to a control content corresponding to either said interrupt issued from an one of said plurality of function blocks or said instruction issued from said CPU, said power supply control unit controls each of said plurality of switch units; and an initiation step for initiating at least one of said plurality of function blocks and said CPU based upon said control content, wherein:

an interrupt issued from any one of said plurality of function blocks contains both a formal interrupt and a provisional interrupt which is issued prior to said formal interrupt, and in said power supply control step, said power supply control unit starts to supply electric power of the power supply with respect to at least one of said plurality of function blocks and said CPU, which will be subsequently initiated, in response to said provisional interrupt.

14. The electric power supply controlling method for a semiconductor integrated circuit as claimed in claim 13, wherein:

in said initiation step, in such a case that even when a counted time of a timer unit for starting a time counting operation in response to said provisional interrupt has elapsed a predetermined time, said formal interrupt is not issued, said power supply control unit initiates said CPU.

15. An electric power supply controlling method for a semiconductor integrated circuit equipped with:

a plurality of function blocks;

a CPU (central processing unit);

a power supply control unit to which electric power of a power supply is continuously supplied, and which controls supplying of electric power of the power supply to said plurality of function blocks and said CPU; and a plurality of switch units controlled by said power supply control unit, for switching an electric power supplying operation of the power supply and an electric power cutting off operation thereof with respect to each of said plurality of function blocks and said CPU, the method comprising steps of:

a reception step in which said power supply control unit receives and stores an interrupt issued from each of said plurality of function blocks, or an instruction issued from said CPU;

a power supply control step in which in response to a control content corresponding to either said interrupt issued from any one of said plurality of function blocks or said instruction issued from said CPU, said power supply control unit controls each of said plurality of switch units; and an initiation step for initiating at least one of said plurality of function blocks and said CPU based upon said control content, wherein:

said power supply control step includes an initializing data transfer step in which after said power supply control unit controls supplying of electric power of the power supply, said power supply control unit transfers initializing data for initializing a function block which will be subsequently initiated, so as to said initiated function block initiated.

16. An electric power supply controlling method for a semiconductor integrated circuit equipped with:

a plurality of function blocks;

a CPU (central processing unit);

a power supply control unit to which electric power of a power supply is continuously supplied, and which controls supplying of electric power of the power supply to said plurality of function blocks and said CPU; and a plurality of switch units controlled by said power supply control unit, for switching an electric power supplying operation of the power supply and an electric power cutting off operation thereof with respect to each of said plurality of function blocks and said CPU, the method comprising steps of:

a reception step in which said power supply control unit receives and stores an interrupt issued from each of said plurality of function blocks, or an instruction issued from said CPU;

a power supply control step in which in response to a control content corresponding to either said interrupt issued from any one of said plurality of function blocks or said instruction issued from said CPU, said power supply control unit controls each of said plurality of switch units; and an initiation step for initiating at least one of said plurality of function blocks and said CPU based upon said control content, wherein:

said control content stored in said power supply control unit contains substrate bias voltage levels corresponding to each of said plurality of function blocks and said CPU, and in said power supply control step, said power supply control unit performs a control operation in such a manner that substrate bias voltages having the substrate bias voltage levels indicated by said control content are applied to said plurality of function blocks and said CPU.

* * * * *